US007835596B2

(12) United States Patent
Hornback, Jr. et al.

(10) Patent No.: US 7,835,596 B2
(45) Date of Patent: Nov. 16, 2010

(54) COMPONENTIZED APPLICATION SHARING

(75) Inventors: Raymond Hornback, Jr., Lexington, KY (US); James S. Johnston, Lexington, KY (US); Mark S. Kressin, Lakeway, TX (US); Andrew M. Ortwein, Lexington, KY (US); William M. Quinn, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 10/737,064

(22) Filed: Dec. 16, 2003

(65) Prior Publication Data
US 2005/0128511 A1 Jun. 16, 2005

(51) Int. Cl.
*G06K 9/60* (2006.01)
(52) U.S. Cl. .................. 382/303; 382/173; 382/232
(58) Field of Classification Search .................. 382/303
See application file for complete search history.

(56) References Cited

U.S. PATENT DOCUMENTS

| | | | | | |
|---|---|---|---|---|---|
| 5,339,172 | A | * | 8/1994 | Robinson | 358/462 |
| 5,434,983 | A | * | 7/1995 | Yaso et al. | 710/110 |
| 5,461,682 | A | * | 10/1995 | Nomura | 382/232 |
| 5,513,282 | A | * | 4/1996 | Williams | 382/303 |
| 5,604,821 | A | * | 2/1997 | Ranganathan et al. | 382/236 |
| 5,758,110 | A | * | 5/1998 | Boss et al. | 715/751 |
| 5,774,634 | A | * | 6/1998 | Honma et al. | 358/1.9 |
| 5,787,414 | A | * | 7/1998 | Miike et al. | 715/243 |
| 5,826,035 | A | * | 10/1998 | Hamada et al. | 709/247 |
| 5,877,819 | A | * | 3/1999 | Branson | 348/701 |
| 5,928,335 | A | * | 7/1999 | Morita | 709/203 |
| 5,933,686 | A | * | 8/1999 | Ootsuka et al. | 399/87 |
| 6,055,017 | A | * | 4/2000 | Shen et al. | 375/240.11 |
| 6,084,686 | A | * | 7/2000 | Ushida | 358/1.16 |
| 6,233,017 | B1 | * | 5/2001 | Chaddha | 375/240.12 |
| 6,259,443 | B1 | * | 7/2001 | Williams, Jr. | 715/741 |
| 6,408,024 | B1 | * | 6/2002 | Nagao et al. | 375/240.01 |
| 6,563,955 | B2 | * | 5/2003 | de Queiroz | 382/239 |
| 6,606,413 | B1 | * | 8/2003 | Zeineh | 382/232 |
| 6,606,636 | B1 | * | 8/2003 | Okazaki et al. | 1/1 |
| 6,714,312 | B1 | * | 3/2004 | Hidaka | 358/1.15 |
| 6,909,436 | B1 | * | 6/2005 | Pianykh et al. | 345/619 |
| 6,983,068 | B2 | * | 1/2006 | Prabhakar et al. | 382/162 |
| 7,073,200 | B2 | * | 7/2006 | Maliszewski | 726/26 |
| 2001/0040699 | A1 | * | 11/2001 | Osawa et al. | 358/1.17 |

(Continued)

OTHER PUBLICATIONS

Jong Whan Jang, Il Kyun Oh, "Performance Evaluation of Scene Change Detection Algorithms", Communications, 1999. APCC/OECC '99. Fifth Asia-Pacific Conference on . . . and Fourth Optoelectronics and Communications Conference, ISBN: 7-5635-0402-8.*

*Primary Examiner*—Sath V Perungavoor
(74) *Attorney, Agent, or Firm*—Daniel P. McLoughlin, Esq.; Steven M. Greenberg, Esq.; Carey Rodriguez Greenberg & Paul LLP

(57) ABSTRACT

The present invention is a method, system and apparatus for componentized application sharing. The system can include a multiplicity of different pluggable image processing modules. Each of the different pluggable image processing modules can conform to a single interface expected by the application sharing module. Additionally, a communicative coupling can be provided between the application sharing module and a selected one of the different image compression modules.

8 Claims, 2 Drawing Sheets

U.S. PATENT DOCUMENTS

| | | | |
|---|---|---|---|
| 2001/0041017 A1* | 11/2001 | De Queiroz | 382/253 |
| 2002/0109665 A1* | 8/2002 | Matthews et al. | 345/156 |
| 2002/0129096 A1* | 9/2002 | Mansour et al. | 709/203 |
| 2003/0007703 A1* | 1/2003 | Roylance | 382/303 |
| 2003/0093568 A1* | 5/2003 | Deshpande | 709/247 |
| 2003/0231246 A1* | 12/2003 | Gindele et al. | 348/222.1 |
| 2004/0202383 A1* | 10/2004 | Larson et al. | 382/303 |
| 2005/0117811 A1* | 6/2005 | Hoshino | 382/260 |
| 2007/0248288 A1* | 10/2007 | Nagao et al. | 382/303 |
| 2008/0013862 A1* | 1/2008 | Isaka et al. | 382/303 |

* cited by examiner

COMPONENTIZED APPLICATION SHARING

BACKGROUND OF THE INVENTION

1. Statement of the Technical Field

The present invention relates to the field of image sharing and more particularly to the distribution of application imagery during an application sharing session between a multiplicity of application viewers.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include instant messaging, Internet telephony and application sharing.

In conventional application sharing, an application host can distribute imagery of an application operating in the host to one or more application viewers distributed about the computer communications network. The imagery can include not only the screens rendered in association with the operation of the shared application, but also the visual presentation of mouse pointer movements and the like. Generally, speaking, however, the imagery can include only discrete "snap-shots" of the actual display of the operating application in the host system. In this way, the application viewers can be given the appearance of sharing an application, though each viewer merely views a shadow rendering of only a portion of the operation of the shared application.

Application sharing technology allows the capturing of a series of images which represent the display of an application. The images can be transmitted across the computer communications network, which when rendered, can provide the illusion of duplicating the display of the application in its host environment. Nevertheless, the underlying technology used to support application sharing in this manner includes substantial limitations in regard to the optimal servicing of multiple disparate shared application types. Specifically, there does not exist any one particular method that produces optimal results for all potential situations where application sharing technology may be utilized.

In more particular illustration, some shared applications include application displays which when rendered, must include the highest of display resolution. Examples include image oriented applications such as medical imaging applications and architectural design applications. In contrast, other shared applications include application displays which when rendered, need not include a high degree of display resolution. Of course, display resolution is not the only performance factor which can vary among different types of shared applications. In this regard, display update frequency requirements can range from infrequent to periodic to often. In this case of a distance learning application, for example, while display resolution may not be important, certainly the speed of delivery of the imagery will be important.

To ensure the highest fidelity in reproducing imagery for shared applications requiring the same, each of the capturing, compressing and transmitting steps associated with image distribution must preserve image detail. Yet, to do so requires a substantial level of computing resources which may be consumed in the course of capturing, compressing and transmitting imagery without a resulting loss in image resolution. By comparison, where the speed of image delivery is of paramount importance, the capturing, compressing and transmitting steps can sacrifice image fidelity in order to obtain speed. Similarly, where the conservative consumption of resources is desired, the capturing, compressing and transmitting process can sacrifice image quality in order to conserve computing resources.

Existing application sharing solutions do not effectively cover the vast range of image fidelity, speed of delivery and computing resource consumption requirements from the finest level of detail to high speed transmission and low computing resource utilization. As a result, some application sharing methodologies are tuned to favor shared applications requiring substantial image fidelity, while others are tuned to sacrifice fidelity in favor of transmission speed or efficiency in the consumption of computing resources.

SUMMARY OF THE INVENTION

The present invention addresses the deficiencies of the art in respect to distributing application imagery in an application sharing session and provides a novel and non-obvious method, system and apparatus for componentized application sharing In a preferred configuration of the system of the invention, the system can include a multiplicity of different pluggable image processing modules. Each of the different pluggable image processing modules can conform to a corresponding single interface expected by the application sharing module. Additionally, a communicative coupling can be provided between the application sharing module and a selected one of the different image compression modules.

Additionally couplings can be provided between different pluggable image compression modules, different pluggable image capturing modules, different pluggable image change detection modules, different pluggable image region selection modules, and different pluggable image transmission modules. As before, each of the modules can conform to a single interface expected by the application sharing module. Preferably, the different image compression modules can include image compression logic programmed to produce either a smallest possible image size to provide a highest possible rate of transmission for a compressed image, or a lowest level of image resolution loss to provide a highest level of image fidelity for a compressed image. Optionally, the different image compression modules can include logic programmed to produce a moderate image size to provide an intermediate rate of transmission and an intermediate level of image fidelity for a compressed image.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is system, method and apparatus for the componentized configuration of a shared application server based upon varying shared application types. In accordance with the present invention, a shared application server can be configured to interoperate with pluggable image processing logic based upon the requirements of a shared application hosted in the shared application server. Where the hosted shared application requires high fidelity imaging, pluggable image processing logic can be selected to achieve lossless image capturing and compression. By comparison, where the shared application requires high transmission speeds regardless of image fidelity, image processing logic can be selected to achieve high image compression ratios and small image packaging sizes. In this way, the characteristics of the shared application can be considered in configuring the shared application server.

Figure 1:
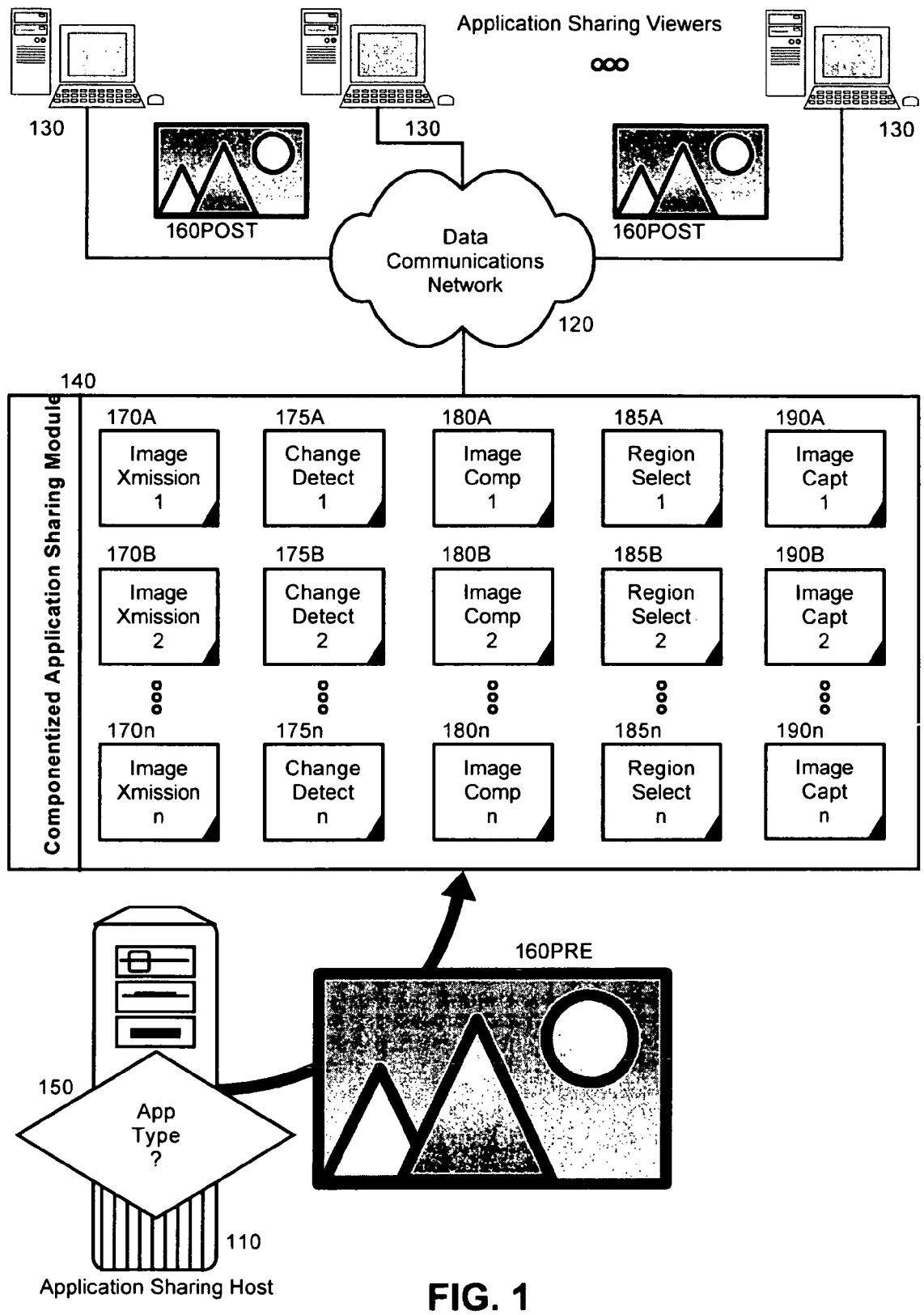
FIG. 1 is schematic illustration of a componentized system for distributing application imagery during an application sharing session in accordance with the present invention; and, FIG. 2 is a flow chart illustrating a process for configuring the componentized system of FIG. 1 to support shared applications of varying types.

In further illustration of the preferred implementation of the present invention, FIG. 1 is schematic illustration of a componentized system for distributing application imagery during an application sharing session in accordance with the present invention. The system can include an application sharing host 110 configured to "share" a shared application with a multiplicity of shared application viewers 130 over a data communications network 120. Importantly, the application sharing host 110 can be configured with a componentized application sharing module 140 in accordance with the inventive arrangements.

Specifically, the componentized application sharing module 140 can be programmed to acquire image frames from a shared application and to share the acquired image frames with the shared application viewers 130 over the data communications network 120 as is well known in the art. To that end, the componentized application sharing module 140 can be programmed to capture image frames from the shared application, to compress the captured image frames to a size suitable for transmission over the data communications network 120, and to transmit the compressed image frames over the data communications network 120. The componentized application sharing module 140 also can be configured to selectively transmit image updates so as to reduce the bandwidth requirements of application sharing, and also the componentized application sharing module 140 can be configured to only selectively update changed regions of application imagery to further reduce the bandwidth requirements of application sharing.

Unlike conventional application sharing modules, however, the componentized application sharing module 140 can be configured with different image processing logical components, each charged with a particular application sharing functional role. In this regard, the different image processing logical components can be logic blocks utilized to efficiently capture, process and transmit application imagery to the shared application viewers 130. Each different logic block can be programmed differently to achieve a processing objective such as efficiency or high fidelity based upon the type of application shared through the componentized application sharing module 140.

In an exemplary albeit non-exclusive arrangement, the different image processing logical components can include image capturing logic 190A, 190B, 190n, image region processing logic 185A, 185B, 185n, image compression logic 180A, 180B, 180n, image change detection logic 175A, 175B, 175n, and image transmission logic 170A, 170B, 170n. The image capturing logic 190A, 190B, 190n can vary from native code type implementations in the art designed to produce quick screen captures in a proprietary manner, to highly portable, but slower screen capturing implementations.

The image region processing logic 185A, 185B, 185n, by comparison, can include logic for partitioning imagery into small sub-partitions. Each sub-partition can be treated in a specified order so that each sub-partition is treated as a separate image. Only where a change is detected a sub-partition is an update to the sub-partition to be transmitted to the shared application viewers 130. Optionally, the order of processing the sub-partitions can be selected in a round-robin fashion. Alternatively, an ordering of processing can be arranged so that the most recently changed sub-partitions can be processed first while the least recently sub-partitions can be processed last. In the former case, a high degree of image fidelity can be maintained. Conversely, in the latter case higher transmission speeds can be attained.

The image compression logic 180A, 180B, 180n can vary from compression logic which can produce a high level of image compression and a corresponding loss of image fidelity, to compression logic which can produce a substantial image fidelity, though the level of image compression can lag. Notably, the type of compression selected in the image compression logic 180A, 180B, 180n can vary. In this regard, each version of the image compression logic 180A, 180B, 180n can further vary according to the amount of processing resources required to compress an image, to the nature of the code, e.g. proprietary or portable, to the nature of the compression format, e.g. standardized or proprietary.

The image change detection logic 175A, 175B, 175n can restrict the updating of shared application imagery only to those instances where the image itself has changed. Of course, the threshold question of whether an image has changed can vary with changing levels of resolution. In particular, where each pixel is analyzed for a change, clearly the image can be updated more frequently. Where an entire subset of pixels is required to change to trigger an update, updates can be less frequent resulting in a more efficient use of network bandwidth.

Finally, the image transmission logic 170A, 170B, 170n can vary from logic intended for a highly reliable image transmission, to logic intended for highly efficient image transmission. Specifically, at one end of the spectrum, a connection oriented transmission protocol can be utilized to establish connectivity with each individual one of the shared application viewers 130 to ensure that each one of the shared application viewers 130 receives an image update for the shared application. Conversely, at the other end of the spectrum, a connectionless transmission protocol can be utilized to ensure a maximally efficient broadcasting of image updates without regard to whether any one of the shared application viewers 130 receives an image update.

Given the multiple logic blocks available for selection in the componentized application sharing module 140, the application sharing host 110 can include internal determination logic 150 for identifying the type of shared application hosted within the application sharing host 110. To the extent that the shared application requires a high fidelity reproduction of application imagery, a specifically tooled set of image capturing logic 190A, 190B, 190n, image region processing logic 185A, 185B, 185n, image compression logic 180A, 180B, 180n, image change detection logic 175A, 175B, 175n, and image transmission logic 170A, 170B, 170n can be selected so as to result in lossless image capturing and compression and the highest possible transmission speeds which will not result in a reduction in image quality when distributing image frames of the shared application to the shared application viewers 130. By comparison, to accommodate a shared application type requiring a high rate of image transmission, a different set of specifically tooled image capturing logic 190A, 190B, 190n, image region processing logic 185A, 185B, 185n, image compression logic 180A, 180B, 180n, image change detection logic 175A, 175B, 175n, and image transmission logic 170A, 170B, 170n can be selected so as to enhance the transmission speed of the application imagery despite the resulting loss in image fidelity.

Notably, different sets of image capturing logic 190A, 190B, 190n, image region processing logic 185A, 185B, 185n, image compression logic 180A, 180B, 180n, image change detection logic 175A, 175B, 175n, and image transmission logic 170A, 170B, 170n can be included within the componentized application sharing module 140, each conforming to a standardized interface for image transmission, change detection, image compression, regional image processing and image capturing logic expected by the componentized application sharing module 140. Each can be tooled to achieve a specific objective—for instance, the detailed and lossless reproduction of a pre-processed image frame 160PRE produced by the shared application when forwarding a post-processed image frame 160POST to the shared application viewers 130. Alternatively, each can be tooled for the fastest possible transmission of the post-processed image frame 160POST which, as it will be understood by the skilled artisan, can result in a loss of image fidelity when compressing the pre-processed image frame 160PRE into the post-processed image frame 160POST to effectuate a small image size. Of course, many intermediate toolings can be provided as well.

Figure 2:
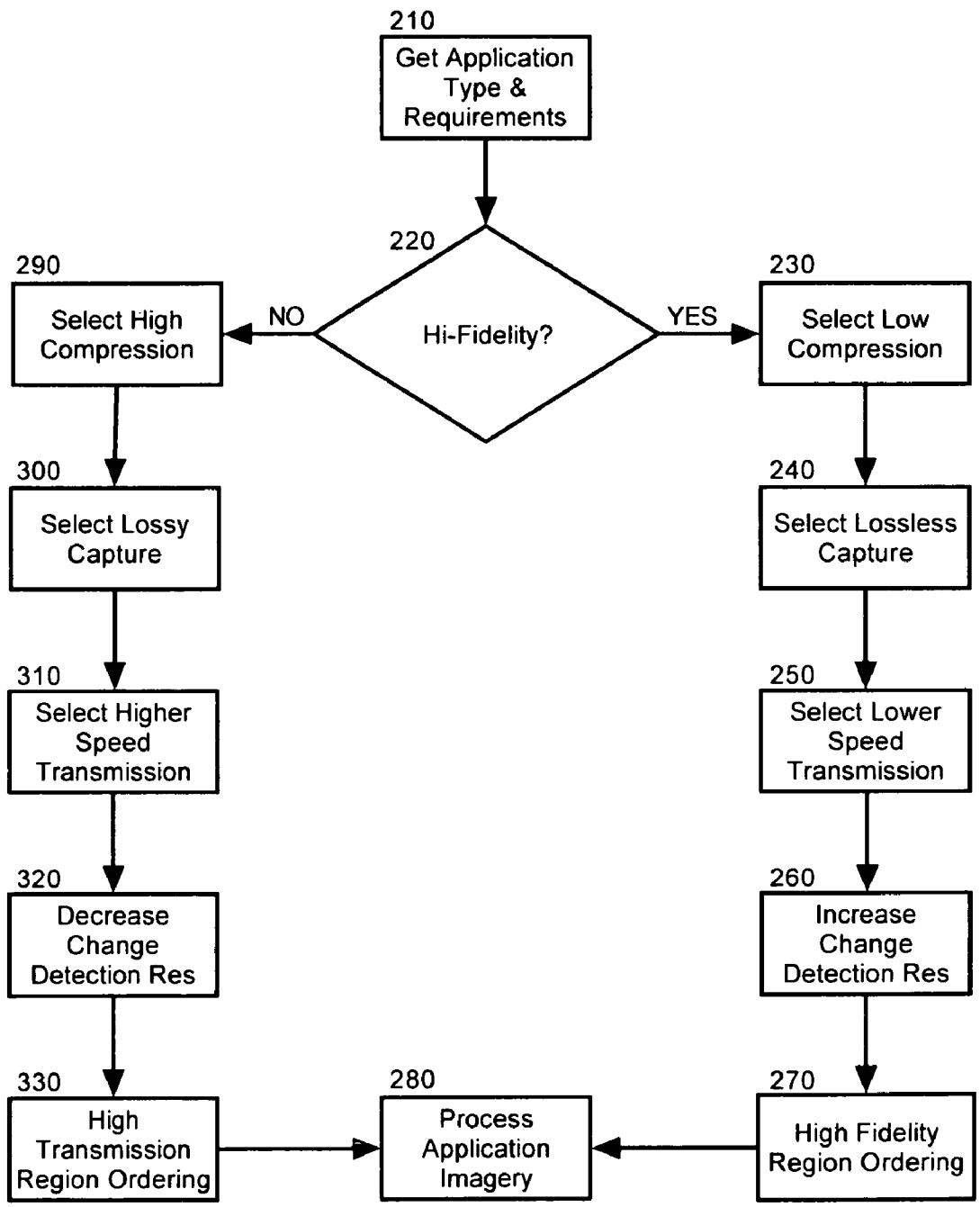

To further illustrate the operation of the application sharing host 110 of FIG. 1, FIG. 2 is a flow chart illustrating a process for selectively configuring the componentized system of FIG. 1 to support shared applications of varying types and requirements. Beginning in block 210, the type and the requirements of the shared application can be identified. Specifically, it can be determined whether the application requires a high-fidelity reproduction of application imagery in the shared application viewers, or whether a higher rate of transmission will be required. Optionally, intermediate positions can be specified and further, the data can be acquired either through pre-specified configuration data, or through a user interface.

If in decision block 220, if a high-fidelity reproduction of application imagery will be required, in block 230, a low compression module can be selected for use in the componentized application sharing module, as can a lossless capturing module in block 240. Optionally, in block 250 a more reliable, albeit slower, rate of transmission can be selected through a corresponding transmission module. Moreover, in block 260 the change detection module can be set at an increased level of resolution to ensure that subtle changes in imagery trigger image updates. Finally, in block 270 the processing of the imagery sub-partitions can be ordered in a way so as to ensure a high degree of image fidelity experienced by the shared application viewers. To that end, a round-robin treatment of the ordering can suffice. In block 280, the application imagery for the shared application can be processed in the componentized application sharing module so as to distribute the application imagery to the shared application viewers.

Returning now to decision block 220, if a high-fidelity reproduction of application imagery will not be required, but a faster rate of image transmission will be required, in block 290, a high-compression module can be selected for use in the componentized application sharing module, as can a lossy capturing module in block 300. Optionally, in block 310 a less reliable, albeit faster, rate of transmission can be selected through a corresponding transmission module. Moreover, in block 320 the change detection module can be set to a decreased level of resolution or sensitivity to reduce the frequency of image updates. Finally, in block 330, a high-transmission speed ordering of the imagery sub-partitions can be selected to further enhance the speed of transmission of changes to the application imagery.

Importantly, while the process of FIG. 2 draws a distinction between high-transmission speeds and a high degree of image fidelity, the scope of the invention is not to be so limited. Rather, the skilled artisan will recognize several other conflicting performance goals based upon which differently tuned versions of the application sharing components can be selected for use in the componentized application sharing module. Examples can include the type and nature of the audience for the shared imagery and the characteristics of the network over which the application imagery can be shared.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A componentized application sharing system, the system comprising:
 a shared application host computer sharing images with at least a plurality of shared application viewer computers:
 a plurality of different pluggable image processing modules implemented on said shared application host computer, each of said different pluggable image processing modules conforming to a corresponding single interface expected by an application sharing module implemented on said shared application host computer, each of said different pluggable image processing modules being selectable to meet requirements of a shared application, said pluggable image processing modules comprising:
- a plurality of different pluggable image region selection modules configured to process selected image sub-partitions of shared application imagery, each of said different pluggable image region selection modules configured for selecting and ordering of processing of said selected image sub-partitions differently;
- a plurality of different image compression modules comprising image compression logic programmed to produce one of a smallest possible image size to provide a highest possible rate of transmission for a compressed image, a lowest level of image resolution loss to provide a highest level of image fidelity for a compressed image, and a moderate image size to provide an intermediate rate of transmission and an intermediate level of image fidelity for a compressed image; and
- a communicative coupling between the shared application host computer and the shared application viewer computers, for transmitting images.

2. The system of claim 1, wherein said pluggable image processing modules comprises a plurality of different pluggable image capturing modules.

3. The system of claim 1, wherein said pluggable image processing modules comprises a plurality of different pluggable image transmission modules.

4. The system of claim 1, wherein said pluggable image processing modules comprises a plurality of different pluggable image change detection modules configured to trigger image updates responsive to changes in portions of a shared application image.

5. A componentized application sharing system, the system comprising:
- a shared application host computer sharing images with at least a plurality of shared application viewer computers;
- a plurality of different pluggable image processing modules implemented on said shared application host computer, each of said different pluggable image processing modules conforming to a corresponding single interface expected by an application sharing module implemented on said shared application host computer, each of said different pluggable image processing modules being selectable to meet requirements of a shared application, said pluggable image processing modules comprising:
  - a plurality of different pluggable image region selection modules configured to process selected image sub-partitions of shared application imagery when triggering image updates for said shared application, each of said different pluggable image region selection modules configured for selecting and ordering of processing of said selected image sub-partitions differently:
  - a plurality of different image compression modules comprising image compression logic programmed to produce one of a smallest possible image size to provide a highest possible rate of transmission for a compressed image, a lowest level of image resolution loss to provide a highest level of image fidelity for a compressed image, and a moderate image size to provide an intermediate rate of transmission and an intermediate level of image fidelity for a compressed image; and
- a communicative coupling between the shared application host computer and the shared application viewer computers, for transmitting images.

6. The system of claim 5, wherein said componentized application sharing module comprises a plurality of different pluggable image capturing modules and an integration with only one of said modules based upon an application strategy selected through said selection logic.

7. The system of claim 5, wherein said componentized application sharing module comprises a plurality of different pluggable image transmission modules and an integration with only one of said modules based upon an application strategy selected through said selection logic.

8. The system of claim 5, wherein said componentized application sharing module comprises a plurality of different pluggable image change detection modules configured to trigger image updates responsive to changes in portions of a shared application image, and an integration with only one of said modules based upon an application strategy selected through said selection logic.

* * * * *